May 16, 1961     B. B. BIDERMAN     2,984,785
EVEN HARMONIC PHASE DETECTOR
Filed Oct. 27, 1958     2 Sheets-Sheet 1
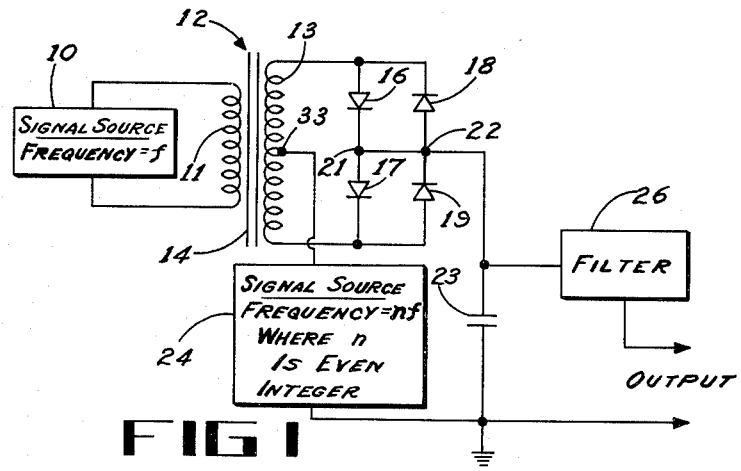
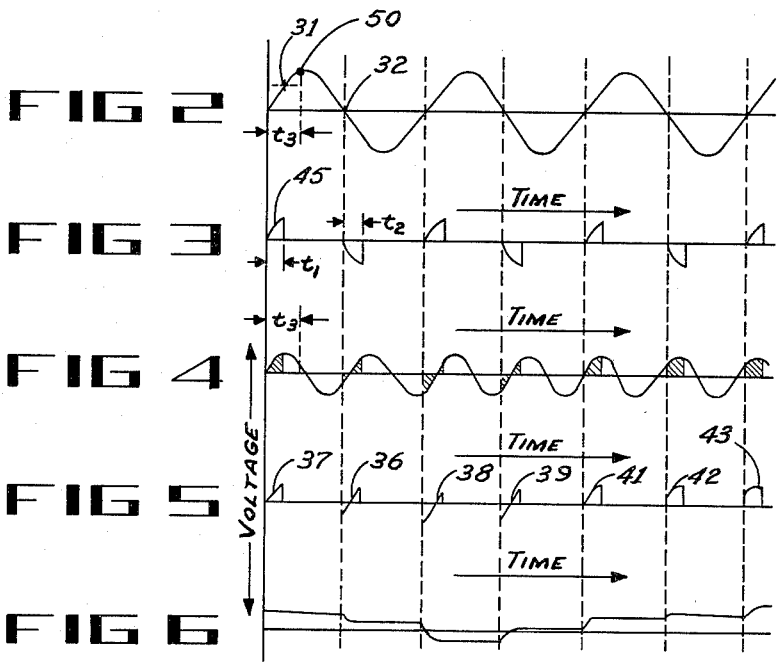
INVENTOR.
BENJAMIN B. BIDERMAN
BY Moody + Phillion
ATTORNEYS May 16, 1961   B. B. BIDERMAN   2,984,785
EVEN HARMONIC PHASE DETECTOR
Filed Oct. 27, 1958   2 Sheets-Sheet 2

INVENTOR.
BENJAMIN B. BIDERMAN
BY Moody and Phillion

ATTORNEYS

United States Patent Office 2,984,785
Patented May 16, 1961

2,984,785

EVEN HARMONIC PHASE DETECTOR

Benjamin B. Biderman, Cedar Rapids, Iowa, assignor to Collins Radio Company, Cedar Rapids, Iowa, a corporation of Iowa Filed Oct. 27, 1958, Ser. No. 769,776

6 Claims. (Cl. 324—87)

This invention relates generally to phase detecting means and more specifically to a phase detecting means for detecting and comparing the phase relationship between a first signal having a given frequency and a second signal having a frequency which is an even harmonic of the frequency of said first signal.

There is currently a need for a reliable and inexpensive phase detecting means (or phase comparing means) capable of detecting and comparing the difference in phase of a first signal having a given frequency and the phase of a second signal having a frequency equal to twice said given frequency. More specifically, for example, such a need arises in magnetic compass systems. In one of such systems the direction of the earth's magnetic field is determined by periodically interrupting the flow of the earth's magnetic field through a magnetic field detecting device which is responsive to such interruptions to produce a signal whose space phase varies with the relative positions of the device and the magnetic field.

Such periodic interruptions can be created by a structure comprising a shield of magnetic material surrounding the magnetic field detecting device, coil means wound around said shield, and signal source means for energizing the coil means. The magnetic shield, the coil wound thereon, and the output signal of the signal source, are selected to have characteristics so that the magnetic shield will become saturated during only a portion of each half cycle of the signal source output signal; for example, one half of each half cycle, thus forming equal and alternate periods of the saturation and nonsaturation of said magnetic field. During the periods of saturation, the earth's magnetic field can pass freely through the magnetic shield and through the detecting device. Since the magnetic shield becomes nonsaturated twice during each complete cycle of the source signal, the passage of the earth's magnetic field through the detecting device will be interrupted twice during each of said cycles. Consequently, there will be produced by the detecting device an output signal having a frequency equal to twice the frequency of the source signal. In such systems, the direction of the earth's magnetic field with respect to the detecting device (which is secured firmly to the vehicle, such as an airplane, in which it is installed) is determined by the phase relationship between the source signal and the output signal of the detecting device. Consequently, it is necessary to detect and translate this phase relationship into a useable form such as a D.C. signal, for example.

Although there are many devices currently available which will detect and compare phase differences between two signals having substantially the same frequency, there are no known simple devices which will compare a signal having a fundamental frequency with a second signal whose frequency is an even multiple of the frequency of said fundamental frequency.

An object of the invention is to provide a simple, reliable and inexpensive device for comparing the phase of a signal having a given frequency with the phase of a signal having a frequency which is an even multiple of said first frequency.

A second purpose of the present invention is to provide a simple circuit for detecting and comparing phase differences between a first signal having a given frequency and a second signal having twice the frequency of said given frequency.

A third object of the invention is to improve phase detectors generally.

In accordance with the invention there is provided a magnetic core transformer having a primary winding and a center tapped secondary winding and constructed to become saturated at a predetermined time after the beginning of each half cycle of a first signal supplied across the primary winding. A first pair of diodes are connected in series arrangement, cathode to anode, across said secondary winding, and a second pair of diodes also are connected in series arrangement, cathode to anode, across said secondary winding in parallel with said first pair of diodes but in opposing polarity with said first pair of diodes. Means including the series combination of a load capacitor and a signal source (constructed to produce a second signal having twice the frequency of said first signal and whose phase is to be compared therewith) are connected across a center tap of the said secondary winding and the junctions between the diodes of each pair of diodes.

The diodes are selected to have an operating characteristic whereby the voltage required to exceed their threshold of conductivity is greater than the peak amplitude of said second signal. Such a characteristic functions to insure that conduction will not occur through the diode to charge the load capacitor except during switching of the magnetic core of the transformer from magnetic flux saturation of one polarity to magnetic flux saturation of the opposite polarity, during which time at least one of the pairs of diodes will be biased beyond the threshold of conductivity by virtue of a voltage induced in said secondary winding.

In accordance with a feature of the invention an asymmetrical device may be inserted in the series arrangement of said load capacitor and said second signal source between said load capacitor and said junction between the pairs of diodes. The said inserted asymmetrical device will function to permit charging of the capacitor in a given polarity but will prevent undesirable discharging thereof back through a conductive diode. Appropriate time constant discharge means may be provided in shunt with said asymmetrical device.

The above mentioned and other objects and features of the invention will be understood more fully from the following detailed description thereof when read in conjunction with the drawings in which:

Fig. 1 is a schematic diagram of a form of the invention;

Fig. 2 illustrates the waveform of a first signal having the fundamental frequency whose phase is to be compared;

Fig. 3 illustrates the voltage induced in the secondary of the magnetic core transformer in response to application of the signal shown in Fig. 2 to the primary thereof;

Fig. 4 shows the waveform of the second signal whose frequency is twice the frequency of the first signal and whose phase is to be compared with the phase of said first signal;

Fig. 5 shows the portions of the signal of Fig. 4 which are conducted through the diodes to charge the load capacitor;

Fig. 6 is a representation of the D.C. voltage appearing across the load capacitor.

Figure 7:
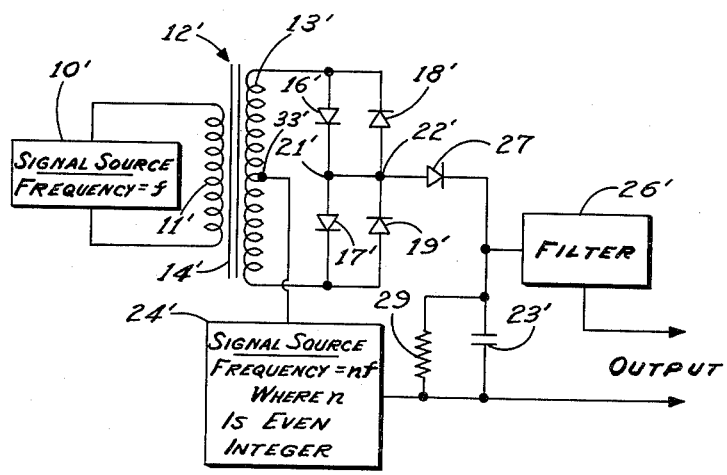
Fig. 7 shows an alternative form of the invention.

Referring now to Fig. 1 a reference signal, having what will herein be defined as a fundamental frequency, is generated by the source 10 and supplied across the primary winding 11 of the transformer 12 which also includes a center tapped secondary winding 13 and a core 14 of magnetic material. The transformer 12 is constructed, and the magnitude of the output signal of signal source 10 is regulated, in such a manner that the magnetic core 14 will become saturated at some predetermined point after the beginning of each half cycle of the signal from source 10. More specifically, assume that the magnetic core becomes saturated after a quarter of a half cycle has occurred at point 31, as shown in Fig. 2. The voltage induced in secondary winding 13 then will be as shown by the waveforms of Fig. 3.

A first pair of diodes 16 and 17 are connected, cathode to anode, in series arrangement across the secondary winding 13. In parallel with the diodes 16 and 17 is a second series arrangement of a pair of diodes 18 and 19 which also are connected cathode to anode. The junctions 21 and 22 between the pairs of diodes are connected together electrically and further are connected to a first plate of load capacitor 23. Connected between the other plate of the capacitor 23 and the center tap 33 of the secondary winding 13 is a second signal source 24 from whence is derived the output signal whose phase is to be compared with the phase of the signal from source 10. Generally speaking, this circuit can be made to function suitably in any case where the frequency of the output signal of source 24 is an even multiple of the frequency of the output signal of source 10, but with, however, the frequency limitations necessarily incumbent upon a structure using magnetic core transformers and silicon diodes. For purposes of describing the operation of the invention herein the frequency multiple selected has been the second harmonic.

The output of the device is taken across a load capacitor 23. Such output signal may be passed through a filter 26 provided to eliminate undesirable ripples therein.

As mentioned hereinbefore the diodes 16 through 19 are selected to have a high conductivity threshold and the signal source 24 is constructed so that the peak amplitude of the output signal thereof will not exceed said conductivity threshold. Such a characteristic is necessary since it is desirable that no current flows through the diodes except during the intervals of time when the magnetic core 12 is switching poles of magnetic saturation, during which time a voltage will be induced across a secondary winding 13 to bias either diodes 16 and 17 or diodes 18 and 19 into their conductive range. This will be discussed more fully later herein in conjunction with the discussion of the operation of the circuit. Silicon type diodes have proven to be quite suitable for application in the structure of Fig. 1 since the threshold of conductivity of the silicon diode is about one-half volt. Other type diodes having suitable characteristics can, however, be used in lieu of silicon diodes. Also, biased diodes can be employed.

The operation of the circuit of Fig. 1 will now be discussed. A voltage signal having the waveform as shown in Fig. 2 is supplied to the primary winding 11 from source 10. Since the core 14 of transformer 12 will saturate at a voltage level represented by reference character 31, the voltage induced in the secondary winding 13 will have a waveform as shown in Fig. 3. As indicated hereinbefore, the waveform of Fig. 3 is due to the fact that once the magnetic core 14 becomes saturated there can be no further change of magnetic flux through the secondary winding 13. Thus there can be no induced voltage therein. However, during the existence of a pulse in winding 13, such as pulse 45 (Fig. 3), the diodes 16 and 17 will be conductive (assuming the upper end of winding 13 to be at a positive potential.) Such saturation of the core 14 will continue until the signal applied to the primary winding 11 reverses polarity as at point 32 in Fig. 2. At this time the magnetic core 14 will begin to saturate in the opposite polarity, thus again producing an induced voltage across the secondary winding 13; said induced voltage having a polarity opposite that induced during the first half cycle of the signal applied to the primary winding 11. Such induced voltage will cause the diodes 18 and 19 to become conductive.

The signal from source 24 would, in the absence of any voltage induced across the secondary winding 13, produce no change in voltage at the junction 22 because the peak amplitude of the signal from source 24 does not exceed the threshold of conductivity of the diodes 16 through 19. However, as described hereinbefore, during the switching of the magnetic core 12, as during the interval of time $t_1$, for example, the diodes 16 and 17 are conductive and the positive signal applied to the center tap 33 of secondary winding 13 can flow through the upper half of winding 13, and the diode 16 to charge the upper plate of load capacitor 23 in a positive direction. During the interval of time $t_2$ the core 14 is again changing saturation polarity and inducing a voltage across the secondary winding 13. This induced voltage causes the diodes 18 and 19 to be conductive so that the signal represented by the portion of the waveform of Fig. 4 occurring during the time $t_2$ will flow through a circuit including the bottom half of secondary winding 13, and the diode 19, to charge the upper plate of the load capacitor 23 in a positive direction.

It will be noted that in the waveform of Fig. 4 the phase thereof is shown at first as being synchronized with the phase of the waveform of Fig. 2, then as lagging the phase of waveform of Fig. 2, then gradually becoming synchronized with the phase of the waveform of Fig. 2 and finally as leading the phase of the waveform of Fig. 2. It is to be noted that in actual practice the change in phase of the two signals being compared would not be as rapid as shown in Figs. 2 and 4. However, for purposes of illustrating different operating conditions, such rapid changes are employed in the drawings.

Referring again to the operation of the circuit during the interval of time $t_2$, it can be seen that the peak value of a signal 36 supplied to the junction 22 will be less than the peak value of the signal 37 supplied thereto a half cycle earlier. Consequently, the charge on the load capacitor 23 will be reduced, as shown in Fig. 6 in which the ordinate represents the amount of charge on the capacitor 23. Similarly, the application of the pulse 38 to the junction 22 will cause the charge on the capacitor 23 to be further reduced as shown in Fig. 6.

Pulsese 39, 41, 42, and 43 of Fig. 5 represent additional pulses supplied to the junction 22 as the phase of the signal from source 24 becomes increasingly leading with respect to the phase of a signal from source 10.

The voltage across the capacitor 23 is then supplied through a filter 26 to obtain a smoother D.C. signal. The D.C. output signal of the filter 26 represents the phase difference between the signal from source 10 and the signal from source 24 and may be employed in any suitable manner.

Referring now to Fig. 7 there is shown an alternative form of the invention, which is similar to the structure of Fig. 1 except that an asymmetrical device 27 and a capacitor discharge resistor 29 have been added. The asymmetrical device 27 is positioned in series with the capacitor 23' and the junction 22' and resistor 29 is shunted across capacitor 29'. This embodiment may be employed where substantially more than quarter cycles of the signal from source 24' are supplied to the capacitor 23'.

More specifically, assume that the transformer 12' is constructed so that it becomes saturated near the peak amplitude of a signal supplied to the primary winding 11' thereof. Such near peak amplitude might be represented by point 50 in Fig. 2, for example. Consequently, the portion of the signal supplied to the tap 33' of the secondary winding 13' from the signal source 24' will be that portion thereof which occurs during the interval of time $t_3$; which, as shown in Fig. 4, is nearly a full half cycle. In the absence of an asymmetrical device such as device 27, the capacitor 23 would charge first to a relatively high value corresponding to the peak potential of the voltage represented by the waveform of Fig. 4 and then, as the voltage from source 24 approached zero, the capacitor 23 would tend to discharge through the diode 18 or the diode 17. Consequently, substantial charge would not be accumulated on the capacitor 23'. However, with the inclusion of the asymmetrical device 27 a positive current flow is permitted to flow into the capacitor 23 but is not permitted to flow back through the high reverse impedance of the asymmetrical device 27. Thus, the capacitor 23 will tend to charge to the highest average peak voltage level of the junction 22. To permit a change of the charge of the capacitor 23 as the average peak value of the voltage at junction 22 changes, the discharge resistance 29 is provided, which, in cooperation with the capacitor 23 forms a relatively long time constant compared with the frequency of the output signal of source 24.

The structures of Figs. 1 and 7 may be employed in applications other than where the phase of the signal having the second harmonic frequency shifts gradually with respect to the phase of the signal having the fundamental frequency. More specifically, in certain applications, such as some servo systems, while the amplitude of second harmonic signal will vary with the degree of asynchronization between the slave and master elements, the phase of the second harmonic signal will be either 0° with respect to a fixed reference signal (the signal having the fundamental frequency) or will be 180° out of phase with said fixed reference signal, depending on whether the slave element of the servo system is leading or lagging the driving element. For example, if the slave element lags the driving element, the second harmonic signal will have a certain amplitude and will have a phase of, say 0° with respect to the phase of the signal having the fundamental frequency. As the slave element approaches synchronization with the driving element, the amplitude of the second harmonic signal will decrease (although the phase relationship will remain 0°) until synchronization is reached, at which time the amplitude of the second harmonic signal will be zero. As the slave element passes through synchronization to lead the driving element, the amplitude of the second harmonic signal will increase as the degree of asynchronization increases, but the phase of the second harmonic signal now will be a constant 180° out of phase with the phase of the signal having the fundamental frequency. It can be seen readily that the structure of Fig. 1, when supplied with such signals as described in this paragraph, will produce a D.C. output signal whose magnitude and polarity are indicative of the degree and "polarity" of asynchronization.

It is to be noted that the forms of the invention shown and described herein are but preferred embodiments of the same and that various changes can be made in the design and configuration thereof without departing from the spirit or scope of the invention.

I claim:

1. Phase comparator means for comparing the phase of a first signal having a given frequency with the phase of a second signal having a frequency which is an even multiple of said first frequency, comprising magnetic core transformer means including a primary winding and a center tapped secondary winding, means for supplying to said primary winding said first signal having an amplitude greater than the voltage required to saturate magnetically said transformer and having a given frequency, said transformer being constructed to become magnetically saturated by a voltage less than the peak value of said first signal, a first pair of similarly poled diodes connected in series arrangement across said secondary winding and having a given threshold of conductivity, a second pair of similarly poled diodes connected in series arrangement across said secondary winding and having said given threshold of conductivity, the polarity of said first and second pairs of diodes being opposed to each other, a series combination of a signal source and a capacitor connected at one end terminal to said center tap and at the other end terminal to the junctions between the diodes of each of the pairs of diodes, said signal source being constructed to produce said second signal having an amplitude less than the threshold of conductivity of said diodes, and a frequency which is an even multiple of said given frequency.

2. Phase comparator means in accordance with claim 1 comprising asymmetrical means connected in series arrangement with said signal source and said capacitor and resistor means connected across said capacitor.

3. Phase comparator means in accordance with claim 2 in which said resistor means has a value to produce, in cooperation with said capacitor, a relatively long time constant with respect to the frequency of said second signal produced by said signal source.

4. Phase comparator means comprising magnetic core transformer means including a primary winding and a tapped secondary winding, means for supplying to said primary winding a signal having a given frequency and an amplitude greater than the amplitude of the voltage required to saturate said magnetic core transformer means, a first pair of similarly poled asymmetrical devices connected in series arrangement across said secondary winding and having a given threshold of conductivity, a second pair of similarly poled asymmetrical devices connected in series arrangement across said secondary winding and having said given threshold of conductivity, the polarity of said first and second pairs of asymmetrical devices being opposed, a series combination of a signal source and a capacitor being connected at one terminal to said tap of said secondary winding and at the other end to the junctions between each of the asymmetrical devices of each of the pairs of asymmetrical devices, said signal source being constructed to produce an output signal whose amplitude is less than the threshold of conductivity of said asymmetrical devices and containing as its principal component a signal having a frequency equal to an even multiple of the frequency of said given frequency.

5. Phase comparator means in accordance with claim 4 comprising third asymmetrical means connected in series arrangement with said signal source and said capacitor, and resistor means connected across said capacitor.

6. Phase comparator means in accordance with claim 5 in which said resistor means has a value to produce, in cooperation with said capacitor, a relatively long time constant with respect to the frequency of the signal produced by said signal source.

References Cited in the file of this patent

UNITED STATES PATENTS

| | | |
|---|---|---|
| 2,244,799 | Paddle | June 10, 1941 |
| 2,377,858 | Bennett | June 12, 1945 |
| 2,429,636 | McCoy | Oct. 28, 1947 |
| 2,446,188 | Miller | Aug. 3, 1948 |
| 2,455,732 | Carter | Dec. 7, 1948 |
| 2,512,495 | Gray | June 20, 1950 |
| 2,676,304 | Ensink | Apr. 20, 1954 |
| 2,829,251 | Patton | Apr. 1, 1958 |
| 2,838,688 | Loewe | June 10, 1958 |
| 2,841,707 | McCulley | July 1, 1958 |

(Other references on following page)

| | UNITED STATES PATENTS | |
|---|---|---|
| 2,900,506 | Whetter | Aug. 18, 1959 |
| 2,902,650 | Kaiser | Sept. 1, 1959 |
| 2,905,896 | Kamp | Sept. 22, 1959 |
| | FOREIGN PATENTS | |
| 697,692 | Great Britain | Sept. 30, 1953 |

OTHER REFERENCES

Waveforms, by Chance et al., M.I.T. Radiation Lab. Series, vol. 19, 1949, published by McGraw Hill Book Co.

"Phase Selective Detectors," article in Electronics, Feb. 1954, p. 188.